(12) United States Patent
Lucus et al.

(10) Patent No.: US 11,344,390 B2
(45) Date of Patent: May 31, 2022

(54) DENTAL APPLIANCE DESIGN AID

(71) Applicant: Gail Lucus, Webster, MA (US)

(72) Inventors: Gail Lucus, Webster, MA (US);
Melanie Cataldo, Webster, MA (US)

(73) Assignee: Gall Lucus, Webster, MA (US)

( * ) Notice: Subject to any disclaimer, the term of this patent is extended or adjusted under 35 U.S.C. 154(b) by 560 days.

(21) Appl. No.: 15/817,871

(22) Filed: Nov. 20, 2017

(65) Prior Publication Data

US 2018/0153665 A1 Jun. 7, 2018

Related U.S. Application Data

(60) Provisional application No. 62/429,937, filed on Dec. 5, 2016.

(51) Int. Cl.
| | |
|---|---|
| *A61C 13/34* | (2006.01) |
| *A61C 13/10* | (2006.01) |
| *A61C 9/00* | (2006.01) |
| *A61C 13/107* | (2006.01) |
| *A61C 19/10* | (2006.01) |

(52) U.S. Cl.
CPC ............ *A61C 13/34* (2013.01); *A61C 9/0046* (2013.01); *A61C 13/0001* (2013.01); *A61C 13/10* (2013.01); *A61C 19/10* (2013.01)

(58) Field of Classification Search
CPC ..... A61C 13/34; A61C 13/0001; A61C 19/10; A61C 5/20
USPC .......................................................... 433/26
See application file for complete search history.

(56) References Cited

U.S. PATENT DOCUMENTS

| | | | | |
|---|---|---|---|---|
| 1,654,387 A | * | 12/1927 | Stenz ..................... | A61C 19/10 434/263 |
| 2,169,719 A | * | 8/1939 | Bush ...................... | A61C 19/10 433/167 |
| 2,789,353 A | * | 4/1957 | Biggs ................. | A61C 13/1013 433/26 |
| 3,878,611 A | * | 4/1975 | Seaman ................. | A61C 19/04 433/72 |
| 5,639,235 A | * | 6/1997 | Lapointe .............. | A61C 13/082 433/215 |
| 10,238,474 B2 | * | 3/2019 | Awad ..................... | A61C 13/01 |
| 2003/0124481 A1 | * | 7/2003 | Zun ....................... | A61C 13/082 433/26 |
| 2009/0142734 A1 | * | 6/2009 | Albert ..................... | A61C 5/20 433/201.1 |

(Continued)

*Primary Examiner* — Edward Moran
(74) *Attorney, Agent, or Firm* — Armis IP Law, LLC

(57) ABSTRACT

A positioning feedback tool for a dental appliance takes the form of a flexible appearance strip for simulating the appearance of an installed dental appliance on a patient wearer. Dental appliances, such as dentures, rest on the gums of a wearer as functional replacements of teeth. The flexible appearance strip has visual images of dental elements (teeth) for replacing the natural teeth, and depict the size, spacing and color of the dental elements in the finished appliance. Dental elements are affixed onto a foundation mold for resembling a natural row of teeth. The foundation mold receives an imprint of the gums of the wearer, and also receives the dental elements to define the placement of the dental elements. Prior to tooth placement in the foundation mold, the flexible appearance strip is disposed against the installed foundation mold so that the patient may visualize the appearance of the finished appliance.

6 Claims, 4 Drawing Sheets

(56) References Cited

U.S. PATENT DOCUMENTS

2009/0148805 A1* 6/2009 Kois ................. A61C 19/10
433/24
2019/0201174 A1* 7/2019 Awad ................ A61C 9/0006

* cited by examiner

DENTAL APPLIANCE DESIGN AID

RELATED APPLICATIONS

This application claims the benefit under 35 U.S.C. § 119(e) of U.S. Provisional Patent Application No. 62/429,937, filed Dec. 5, 2016, entitled "DENTAL APPLIANCE DESIGN AID," incorporated herein by reference in entirety.

BACKGROUND

Dental appliances, such as dentures for replacement of ailing teeth, have evolved to the point of standard laboratory fabrication routines based on a mold of a patient's gumline. Such appliances generally become a conspicuous feature of the patient's face and profile, yet inattention and generalization to high volume production can leave the patient with an unflattering effect due to aesthetic and dimensional aspects of the dental appliance that are unaligned with other facial features or personal preferences.

SUMMARY

A positioning feedback tool for a dental appliance takes the form of a flexible appearance strip for simulating the appearance of an installed dental appliance on a patient wearer. Dental appliances, such as dentures and dental implants, rest on the gums of a wearer as functional replacements of teeth. The flexible appearance strip has visual images of dental elements (teeth) for replacing the natural teeth, and depict the size, spacing and color of the dental elements in the finished appliance. Dentures include a foundation mold upon which the dental elements are affixed for resembling a natural row of teeth. The foundation mold receives an imprint of the gums of the wearer, and also receives the dental elements to define the placement of the dental elements. Once the dental elements are placed to define the replacement teeth, a molding and fabrication process transfers the positioned teeth to a rigid acrylic foundation. Prior to tooth placement in the foundation mold, the flexible appearance strip is disposed against the installed foundation mold so that the patient may visualize the appearance of the finished appliance and define a gumline for tooth placement.

In a particular configuration, the placement device allows positive identification of deployed placement location relative to the gum line of a patient. A template defines a visual rendering of placement height, color, size and number of dental elements, such as prosthetic teeth. The template is adapted for temporary visual interjection onto or adjacent to a patient gumline and any existing teeth, allowing visual rendering of an appearance of a finished dental appliance (denture) based on the positioned template. Identification of a tooth shade, shape and number is effected by selection of a number of printed templates, each depicting the appearance of the finished appliance. Positioning is performed by moving the template in a vertical or horizontal orientation against the patient's gumline to visualize penetration (length) of the prosthetic teeth as well as a ratio of gum-to-tooth exposure. The visualized vertical position of the template is transferred so that the finished appliance retains the vertical position when installed. Disproportional appearance of tooth-to-gum exposure is avoided because an arbitrary or average vertical gumline position, often employed in conventional approaches, is visualized and approved by the patient. Visualization is either from a mirrored image of the template placed against the gumline, or graphical screen imaging by moving an iconized image of the template against the patient image, such as mouse (point and click) or keystrokes.

Positioning of the flexible appearance strip on the foundation mold allows adjustment of the vertical position, horizontal appearance and shade of the replacement teeth prior to permanent fixation in the rigid foundation. Different flexible appearance strips may be employed to define different widths, height and shade of teeth, and freely disposed horizontally and vertically to position the gumline of the finished appliance. Separate flexible appearance strips are employed for top and bottom gums. Wearers iteratively position the flexible appearance strip by adherence to the foundation mold until a pleasing and therapeutic appearance is found.

The flexible appearance strips detach between a gum portion and a tooth portion for separation of the tooth images to allow accurate placement of the dental elements according to the gumline defined by the gum portion. The tooth portion of the adhered strip is peeled, detached, or pulled away such that the positioned gum portion leaves a visible gumline. The separation takes the form of the contour of the teeth meeting the gum, or alternatively may simply be a straight line approximating the gumline. Positioning of the dental elements into the foundation according to the gum portion assures that the replacement teeth match the selected placement position. The positioned dental elements remain disposed as the rigid acrylic forms in place of the foundation mold, typically a wax responsive to heat. The result is a finished dental appliance having replacement teeth positioned in a foundation that matches the selected appearance and gumline positioning previously selected, avoiding patient disappointment from variations during the transition from the foundation mold to the finished dental appliance.

In further detail, the disclosed device is operable in accordance with a method of fabricating the dental appliance, and commences with identification of a flexible appearance strip depicting a shade and shape of a set of dental elements adapted for fixation in the fabricated dental appliance. Once the desired appearance strip, or template, is selected, a foundation mold is disposed onto a deployment location in the patient's mouth, such that the deployment location is on a gum region of a patient from which the foundation mold was cast. The flexible appearance strip is temporarily placed on the foundation mold for rendering a visual image approximating a finished dental appliance. The appearance strip has a gumline portion and a tooth portion, such that the tooth portion depicts a visual appearance of dental elements for inclusion in the dental appliance, and the gumline portion is adapted for positioning based on a gumline location of the finished dental appliance. The patient/wearer views the appearance strip in a mirror while positioning on the foundation mold to identify a suitable placement location.

The flexible appearance strip has a separation defining the gumline portion, and a gumline contour separates the gumline portion and the tooth portion. A pin, adhesive or fixation adheres the flexible appearance strip on the foundation mold based on the deployment location selected by the patient. The adhesion is adapted for adherence to the foundation mold, and the separation is configured for detachment of the tooth portion from the gumline portion. Once the tooth portion is peeled away, or detached, the gumline preserves the positioning in which the gumline contour defines a demarcation between a foundation formed from the foundation mold and the positioned dental elements.

The deformable surface of the foundation mold receives a plurality of dental elements corresponding to the separation for establishing the gumline contour based on the previous positioning. Once the dental elements are positioned, a fabrication process transforms the foundation mold to a permanent, rigid foundation while maintaining the dental elements in a received position defined by the gumline contour.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
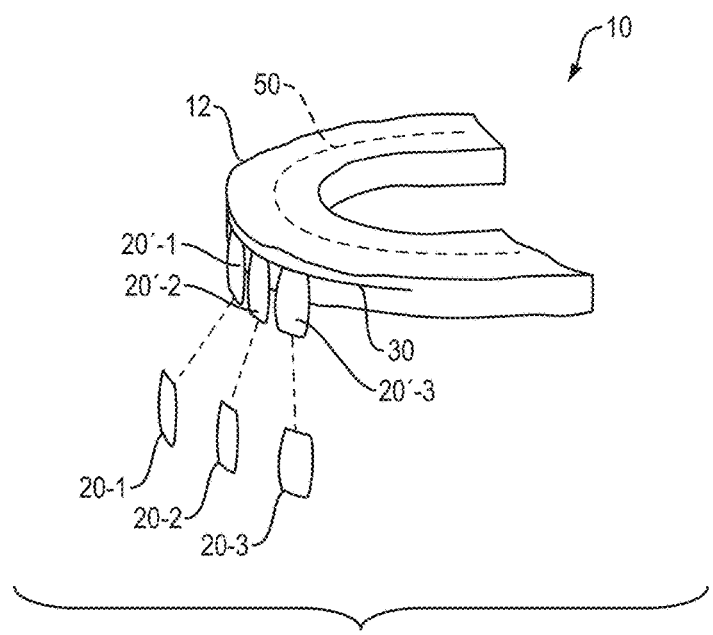
FIG. 1 shows a prior art denture fabrication approach.

Configurations depicted below illustrate example usage of the positioning device in conjunction with a denture set during fabrication. Dentures undergo several steps including molding of the patient's gumline. The claimed approach augments conventional approaches by providing a template or guide via the positioning device during placement of the replacement dental elements. The disclosed positioning device adheres to the foundation mold defined by a wax impression or other molded gum impression fitted to the patient's gum and jaw structure. Denture fabrication involves several molded stages to develop an appliance that disposes the dental elements in a fixed position secured in an acrylic form fitted to the gumline. During the fabrication process, manual intervention positions the dental elements in a wax impression that defines the fixed acrylic form. This manual positioning allows arbitrary placement of the dental elements (teeth), such that eccentric or exaggerated placement transfers these irregularities to the fixed acrylic form and may result in an unflattering appearance.

Conventional approaches to dental appliance fabrication generally operate from a mold of the patients gum and existing teeth, and purport to implement an aesthetically pleasing replacement tooth and gumline that substantially matches the patient's natural physique. Unfortunately, conventional approaches to dental appliance fabrication suffer from the shortcoming that the generated dental appliance may not share similar positioning or features with the patient's natural appearance, and may result in a higher or lower gumline and/or different shade or shape of teeth. The result is that the patient's appearance with the dental appliance has disproportionate tooth or gum exposure due to the dental appliance extending a greater or lesser distance from the gumline. Different colored teeth and/or a shape thereof can also exacerbate a deviation from the natural appearance of the patient.

Configurations herein substantially overcome the above described shortcomings by defining a dental appliance design aid that allows precise positioning of a dental appliance by rendering a visual facial image of the installed dental appliance through identification of an installed height of the dental appliance and rendering a visual simulation of the tooth/gumline exposure and depth. Patients may either physically adhere a physical template, or graphically manipulate a digital iconized template emulating the appearance of the dental appliance, and establish placement, shade and shape corresponding to final denture placement. A patient selects a shade and shape from an assortment of available sets of dentures, then positions them while observing the facial image with the template to establish a visually appealing image based on the placement, shade and shape. The shade and shape are noted, and the position, most notably the gumline of the template, are transferred to fabrication of the dental appliance such that the finished dental appliance has the same installed height and appearance as the facial template image.

FIG. 1 shows a prior art denture fabrication approach; in a conventional dental appliance 10, a wax impression 12 obtained by molding or imaging receives dental elements 20-1 . . . 20-3 (20 generally), intended to simulate the natural teeth that the dental appliance replaces. Conventional approaches place the dental elements, at an arbitrary depth relative to an estimated gumline 30 that may deviate from a true or aesthetic gumline 50. The result is that often the teeth are not placed deep enough into the wax impression 12 and the finished appliance exhibits excessive gum and tooth exposure, due a deviation 40 between the aesthetic gumline 50 and the estimated gumline 30 at which the teeth are positioned.

Figure 2A:
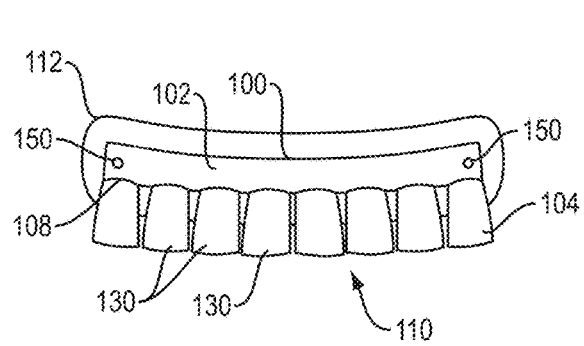
FIGS. 2A and 2B show placement of dental elements (teeth) as disclosed herein.
Figure 2B:
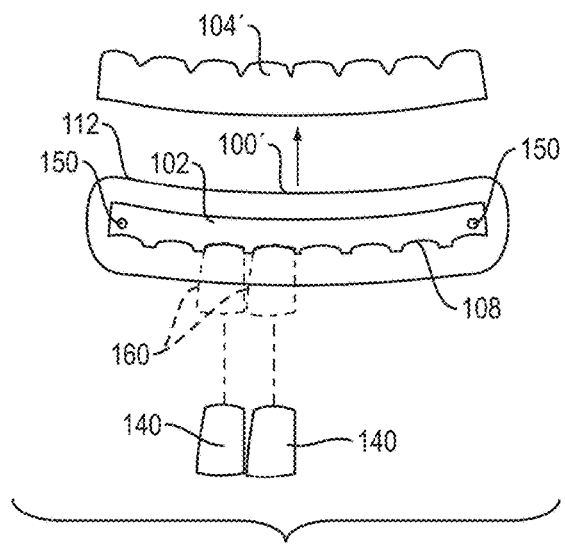

FIGS. 2A and 2B show placement of dental elements (teeth) as disclosed herein. Referring to FIGS. 2A and 2B, the claimed approach employs a foundation molding (mold) 112 depicting an engagement region of the finished appliance, such as a wax impression or other fitting model taken from the patient's anatomy. The positioning device 110 for a dental appliance includes a flexible appearance strip 100 for rendering a visual image approximating a finished dental appliance as it will be deployed in the patient's mouth. The appearance strip 100 has a gumline portion 102 and a tooth portion 104, such that the tooth portion 104 depicts a visual appearance 130 of dental elements 140 for inclusion in the completed dental appliance.

The gumline portion 102 is adapted for positioning based on a gumline location of the finished dental appliance. A gumline contour separating the gumline portion 102 and the tooth portion 104 defines a separation 108 where the tooth portion 104 is detachable from the gumline portion 102. An adhesion 150 on the gumline portion 102 is adapted for adherence to the foundation mold 112. The foundation mold 112 is receptive to the gumline portion 102 for positioning of dental elements in the foundation mold based on the gumline contour defined by the gumline portion 102. After positioning, the detached tooth portion 104' is removed, leaving the affixed gumline portion 102 as a guide defining the gumline for dental element 140 placement. Each of the dental elements 140 depicted on the appearance strip 100 in the dental appliance corresponds to a tooth being replaced by a respective dental element 140.

The flexible appearance strip 100 therefore provides the separation 108 defining the gumline portion 102, such that the separation 108 is configured for detachment of the tooth portion 104 and the gumline portion 102 for positioning of the dental elements 140. The dental technician or assistant placing the dental elements 140 aligns them to the gumline portion 102, as shown by dotted outlines 160. The gumline contour therefore defines a demarcation between a foundation formed from the foundation mold 112 and the positioned dental elements 140. In a particular configuration, the flexible appearance strip is derived from an electronic library of available tooth shades and sizes. A patient selects from printed samples or an electronic screen rendering depicting a shade and shape of a set of dental elements in an electronically renderable form. The electronic form denotes the separation based on demarcation between a visual tooth image and a gum tissue image on the flexible appearance strip.

Figure 3:
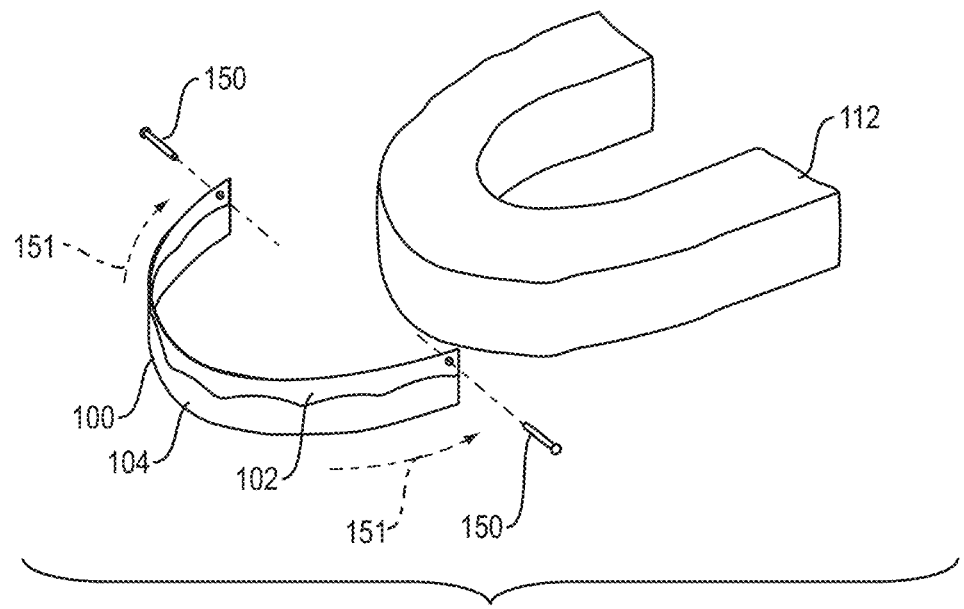
FIG. 3 show a perspective view of positioning device installation in the approach of FIGS. 2A and 2B.
Figure 4:
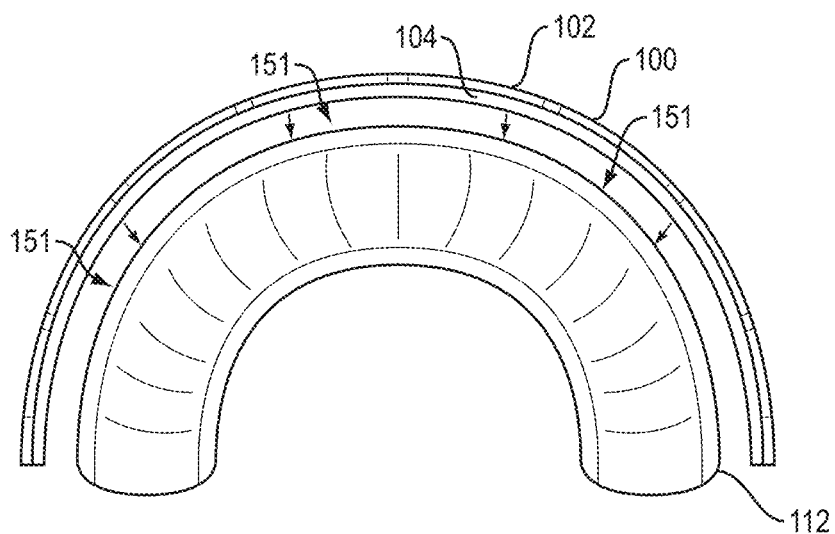
FIG. 4 shows a plan view of device placement in FIG. 3.

FIG. 3 show a perspective view of positioning device 110 installation in the approach of FIGS. 2A, 2B and FIG. 4 shows a plan view of device placement in FIG. 3. Referring to FIGS. 2A-4, the appearance strip 100 is shown prior to adherence to the foundation mold 112. As the appearance strip 100 approaches the molding 112, shown by arrows 151, the adhesions 150 position the strip 100 on the molding, and allow for repositioning to achieve an aesthetically pleasing appearance. Although the adhesions 150 are shown as elongated prongs adapted for disengageable insertion into the resilient foundation mold 112, other attachment approaches may be employed. The adhesion may be an adhesive film coated on an opposed side of the flexible appearance strip 100. The adhesive adheres to the smooth surface of the wax defining the mold 112, and is non-toxic and preferably environmentally "green" or adaptable for disposal/recycling streams. The adhesion 150 may also be defined by a magnetic fixation to the appliance mold, or by corresponding markings or tick marks on the appliance mold and the appearance strip. Whatever approach is employed, the adhesion fixes the gumline portion 102 to the molding 112 long enough to guide the placement of the dental elements 140.

Figure 5:
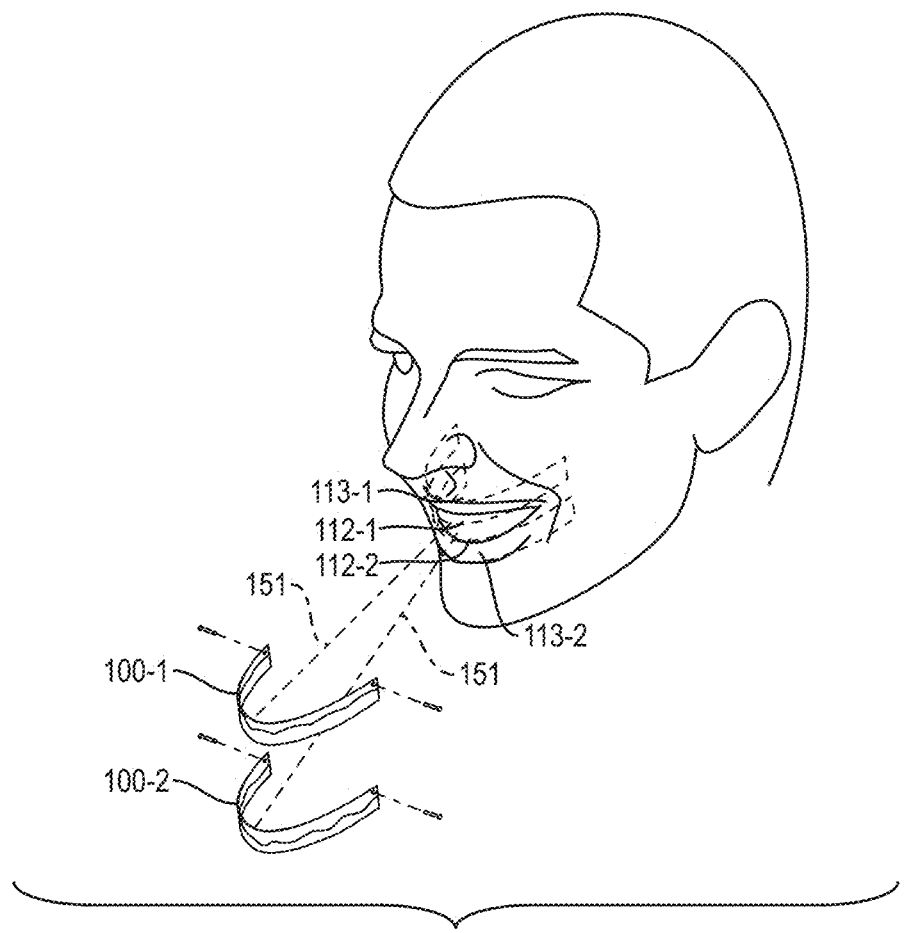
FIG. 5 shows patient usage of the positioning device for locating the appearance strip on a wax impression.

FIG. 5 shows patient usage of the positioning device 110 for locating the appearance strip 100 on a wax impression. Referring to FIGS. 3-5, a plurality of foundation molds, typically an upper 112-1 and lower 112-2 (112 generally) are employed for a patient fitting and fabrication. After placement of the foundation molds 112 on the patient's gums 113-1, 113-2, the appearance strips 100-1, 100-2 (100 generally) corresponding to respective upper 112-1 and lower 112-2 foundation molds adhere to the foundation molds 112 for positioning, as shown by arrows 151. Appearance strips 100 are adapted for iterative repositioning to achieve a desired aesthetic appearance while the patient views the positioned location in a mirror or video rendering. Once a finished placement location is identified, the adhered appearance strips 100 remain affixed to the foundation mold 112 for final placement of the dental elements (teeth).

Following placement of the dental elements in the foundation mold 112, any suitable denture fabrication approach may be employed. Typically the foundation mold 112, also referred to as a tray or baseplate, is processed in a sealed flask device which melts or otherwise removes the pliable wax structure and replaces it with a more rigid, acrylic molding that defines the finished appliance.

Figure 6:
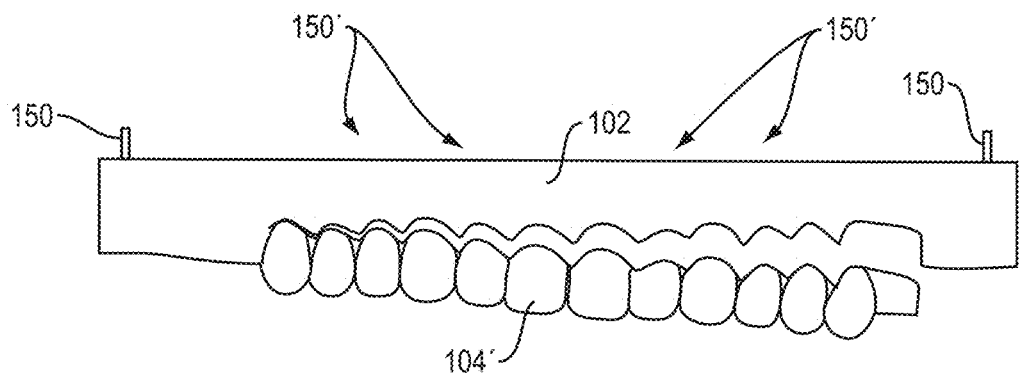
FIG. 6 shows a plan view of the placement device prior to installation.

FIG. 6 shows a plan view of the placement device 110 prior to installation. Referring to FIGS. 2A-6, the detached tooth portion 104' may be separated by gently peeling or pulling the tooth portion 104 away from the adhered appearance strip 100. The separation 108 defining the new gumline may be defined by a variety of approaches. The separation 108 may be formed from laser perforations, may be based on an image scan of a patient gumline, and/or may be defined simply by a straight linear cut defining the gumline. A nonlinear approach to cutting/perforating the separation allows a curved contour of the replacement dental elements, based on agreement between the dental elements 140 and their counterpart images on the tooth portion 104. In other words, the replacement dental elements 140 may be matched to the shape, size and color of the rendered images on the tooth portion. The adhesions 150 are disposed on the gumline portion 102, as that is the portion that remans with the foundation mold 112 during dental element installation/placement. As indicated above, adhesion may also take the form of an adhesive, glue, or resilient member 150' on the engaging side of the appearance strip 100.

Figure 7:
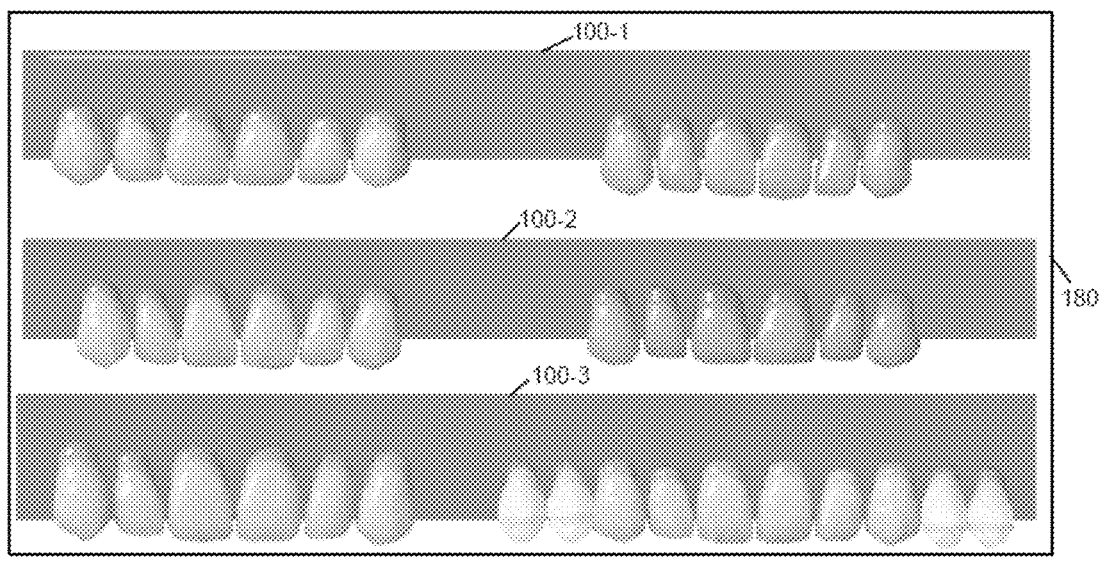
FIG. 7 shows a plurality of placement devices adapted for size, placement and color selection by a patient as in FIG. 5.

FIG. 7 shows a plurality of placement devices adapted for size, placement and color selection by a patient as in FIG. 5. Referring to FIGS. 5-7, the appearance strip 100 may be rendered as a selection sheet 180 depicting a plurality of tooth shades, sizes and depth arrangements to allow the patient to select an appropriate whiteness, tooth size, spacing and intrusion into the mouth cavity by selection of different appearance strips 100-1 ... 100-3. In this manner, the patient selects and visualizes not only horizontal and vertical placement, but also the shade, width and height (i.e. bite depth) of the replacement dental elements 140.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A system for positioning and fabricating a dental appliance, comprising:
   a flexible appearance strip for rendering a visual image approximating the finished dental appliance, the appearance strip having a gumline portion and a tooth portion, the tooth portion depicting a visual appearance of actual dental elements which are used in forming the finished dental appliance, the flexible appearance strip adapted for positioning on a foundation mold based on a gumline location of the finished dental appliance;
   wherein a gumline contour separating the gumline portion and the tooth portion defines a separation having a curved contour based on the visual appearance of the actual dental elements;
   a molding material defining a foundation for the actual dental elements; the foundation mold for first receiving the flexible appearance strip and later for receiving the molding material and positioning the actual dental elements at a depth in the molding material based on the location and shape of the flexible appearance strip and its gumline contour;
   an adhesion on the gumline portion, the adhesion adapted for adherence to the foundation mold during oral placement, the adhesion adapted to allow positioning and repositioning of the flexible appearance strip on the foundation mold to achieve a desired aesthetically pleasing appearance of the strip during oral placement, thereby approximating the appearance of the finished dental appliance when worn by the patient;
   the flexible appearance strip including the separation defining the gumline portion, the separation configured to allow for detachment and removal of the tooth portion from the gumline portion while the gumline portion remains adhered to the foundation mold by the adhesion to define placement of the actual dental elements in the molding material received on the foundation mold based on the separation, the separation comprising perforations between the gumline portion and the tooth portion, the tooth portion separable at the perforations;

and wherein the foundation mold is configured to receive the molding material based on the gumline contour defined by the adhered gumline portion of the flexible appearance strip positioned on the foundation mold, thereby guiding the placement of the actual dental elements in the molding material applied to the foundation mold, the molding material defining the foundation having the actual dental elements positioned therein to define the finished dental appliance.

2. The system of claim 1 wherein each of the actual dental elements in the finished dental appliance corresponds to a tooth being replaced.

3. The system of claim 1 wherein the adhesion is an adhesive film coated on an opposed back side of the flexible appearance strip.

4. The system of claim 1 wherein the perforations are formed by a laser.

5. The system of claim 1 wherein the separation is based on an image scan of a patient's gumline.

6. The system of claim 1 wherein the molding material for forming the foundation is acrylic.

* * * * *